(12) United States Patent
Gonguet et al.

(10) Patent No.: US 10,460,323 B2
(45) Date of Patent: Oct. 29, 2019

(54) SYSTEMS AND METHODS FOR COMMUNICATING INFORMATION

(71) Applicant: Facebook, Inc., Menlo Park, CA (US)

(72) Inventors: Vincent Gonguet, Menlo Park, CA (US); Steven James Jarrett, Alameda, CA (US)

(73) Assignee: Facebook, Inc., Menlo Park, CA (US)

( * ) Notice: Subject to any disclaimer, the term of this patent is extended or adjusted under 35 U.S.C. 154(b) by 245 days.

(21) Appl. No.: 14/728,314

(22) Filed: Jun. 2, 2015

(65) Prior Publication Data

US 2016/0358183 A1 Dec. 8, 2016

(51) Int. Cl.
*G06Q 30/00* (2012.01)
*H04L 29/08* (2006.01)

(52) U.S. Cl.
CPC ......... *G06Q 30/016* (2013.01); *H04L 67/141* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,374,246 B1* | 4/2002 | Matsuo | ................ | G06Q 10/107 707/752 |
| 8,300,637 B1* | 10/2012 | Bennett, III | ........ | H04L 61/2015 370/389 |
| 8,306,202 B2* | 11/2012 | Citron | ..................... | H04M 1/56 379/142.06 |
| 2002/0141404 A1* | 10/2002 | Wengrovitz | ...... | H04L 29/06027 370/389 |
| 2007/0121584 A1* | 5/2007 | Qiu | .................... | H04M 3/42042 370/352 |
| 2007/0230374 A1* | 10/2007 | Altberg | ................. | H04M 7/006 370/271 |
| 2008/0032688 A1* | 2/2008 | Chew | ................ | G06F 17/30017 455/425 |
| 2008/0198987 A1* | 8/2008 | Daly | ..................... | H04M 3/229 379/114.05 |

* cited by examiner

*Primary Examiner* — Steven S Kelley
(74) *Attorney, Agent, or Firm* — Sheppard Mullin Richter & Hampton LLP

(57) ABSTRACT

Systems, methods, and non-transitory computer-readable media can determine a request for establishing a communication between a first computing device and a second computing device. Information to be provided to the second computing device can be determined. An address can be associated with the information to be provided to the second computing device. The communication between the first computing device and the second computing device can be established. The address can be provided to the second computing device when establishing the communication and the second computing device can obtain the information using the at least one address.

13 Claims, 8 Drawing Sheets

SYSTEMS AND METHODS FOR COMMUNICATING INFORMATION

FIELD OF THE INVENTION

The present technology relates to the field of communicating information between computing devices (or systems). More particularly, the present technology relates to techniques for encoding and communicating various information about users to computing devices (or systems).

BACKGROUND

Today, people often utilize computing devices (or systems) for a wide variety of purposes. Users can use their computing devices to, for example, interact with one another, create content, share information, and access information. In some instances, a user can operate a computing device to access a website. While accessing the website, the user may be presented with a selectable object (e.g., button, image, text, etc.) which, when selected, can initiate a communication with an entity (e.g., a customer service representative).

Under conventional approaches, such forms of communication, which may be referred to as "click-to-call," can involve, for example, establishing a voice call between a mobile device of the user and a computing device of an entity. The communication may be established by utilizing various technologies for delivering voice, or multimedia, communications over a network (e.g., the Internet), such as Voice over IP (VoIP), for example.

Under such conventional approaches, however, the entity (e.g., a customer service representative) answering the user's call is typically unable to access any information about the user other than that which may be provided with the caller identification ("caller ID") information. Therefore, the entity answering the user's call typically needs to query the user regarding the nature of the call as well as any other information that may be needed for purposes of processing the call.

SUMMARY

Various embodiments of the present disclosure can include systems, methods, and non-transitory computer readable media configured to determine at least one request for establishing a communication between a first computing device and a second computing device. Information to be provided to the second computing device is determined, the information describing at least one or more attributes of a user operating the first computing device. At least one address is associated with the information to be provided to the second computing device. The communication between the first computing device and the second computing device is established. The at least one address is provided to the second computing device when establishing the communication and the second computing device is able to obtain the information using the at least one address.

In an embodiment, determining the at least one request for establishing the communication includes determining that the user operating the first computing device has selected an option for establishing the communication with the second computing device, the option being associated with a content item provided to the first computing device by the computing system.

In an embodiment, the information includes at least one of: demographic information of the user, information describing the first computing device, information describing a network experience of the user, information describing a network carrier through which the first computing device is communicating, information provided by the network carrier, information describing at least one content item selected by the user, or information describing at least one targeting segment corresponding to the user.

In an embodiment, associating the at least one address with the information includes selecting the at least one address from a set of addresses, correlating the information with the at least one address, and storing the correlation between the at least one address and the information, wherein the information is able to be obtained using the at least one address.

In an embodiment, when the information includes a first value and a second value, associating, by the computing system, the at least one address with the information includes determining, based on the information, that the information includes the first value and the second value, determining, from a set of addresses, the at least one address that has been allocated to correspond to the first value and the second value, and selecting the at least one address to communicate the information, wherein the information is able to be determined based solely on the selected at least one address.

In an embodiment, the at least one address is one of: a phone number, an e-mail address, or a network address.

In an embodiment, an application programming interface (API) is provided for obtaining information associated with addresses, wherein the second computing device is able to obtain the information associated with the at least one address by providing the at least one address to the API.

In an embodiment, determining information to be provided to the second computing device includes determining that the user operating the first computing device has selected an option for establishing the communication with the second computing device, the option being associated with a content item provided to the first computing device by the computing system, determining one or more targeting segments associated with the content item, and determining one or more attributes of the user that correspond to the respective targeting segments associated with the content item, wherein the one or more attributes of the user are included in the information provided to the second computing device.

In an embodiment, associating the at least one address with the information includes determining a priority level of the communication, selecting the at least one address from a set of addresses based at least in part on the priority level, wherein one or more addresses in the set of addresses are allocated to represent a respective priority level, and associating the information with the at least one address.

In an embodiment, determining the at least one request for establishing the communication includes determining that the user operating the first computing device has selected an option for establishing the communication with the second computing device, the option provided to the first computing device by the second computing device.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
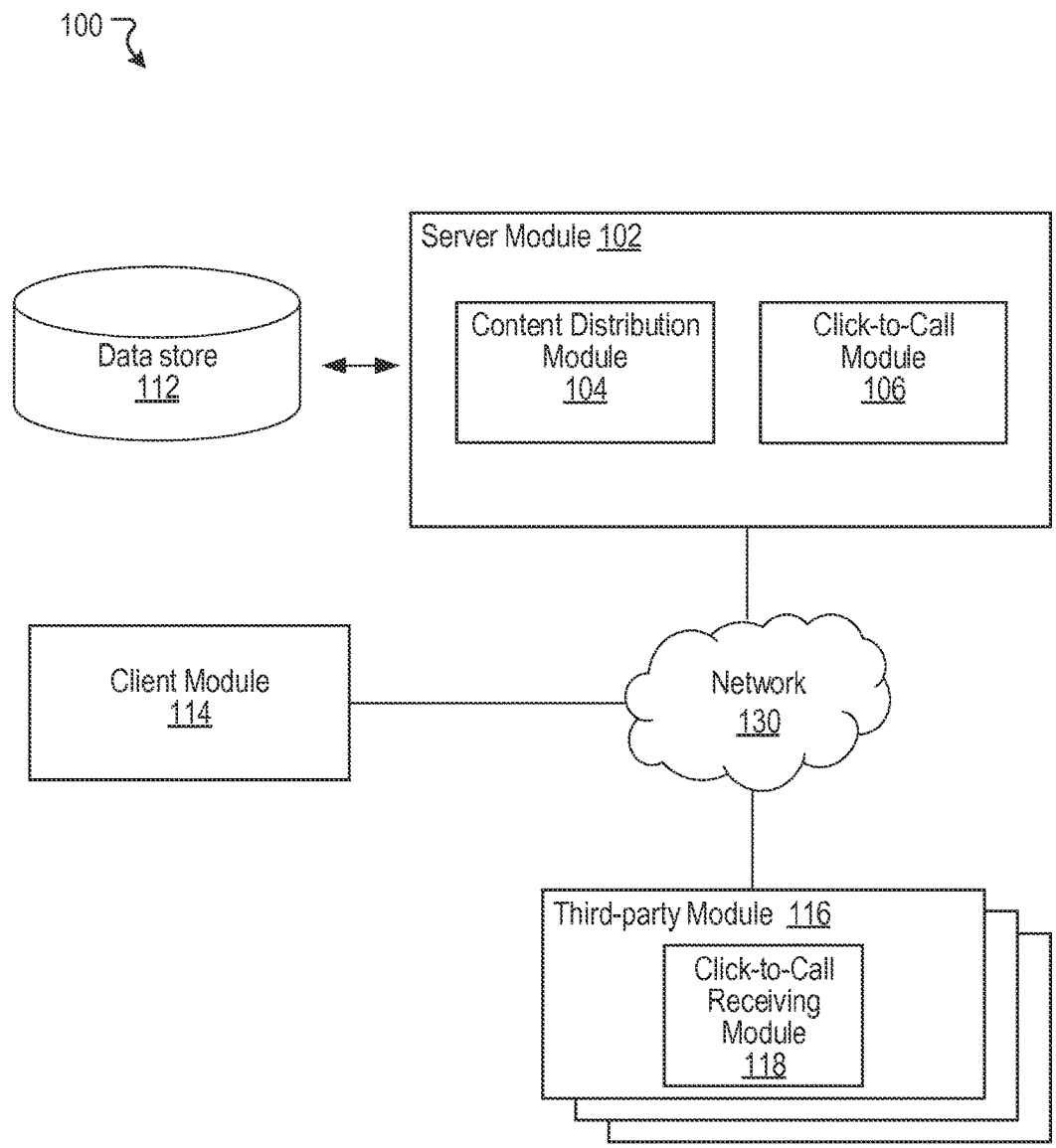
FIG. 1 illustrates an example system including an example server module configured to facilitate communications between a client module and a third-party module over a network, the client module configured to initiate communications through the server module, and the third-party module configured to receive communications initiated by the client module, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Approaches for Encoding and Decoding Information

People use computing devices (or systems) for a wide variety of purposes. As mentioned, a user can operate a computing device to establish a communication (e.g., voice call) over a network (e.g., the Internet) by selecting an object (e.g., button, image, text, etc.) that is presented on a website. Such forms of communication may be referred to as "click-to-call" or "click-to-talk." For example, an electronic commerce website may include a button that allows the user to establish a communication with a customer service representative. Upon selecting the button, a voice call can be established between the computing device (e.g., mobile phone) of the user and a computing device of the customer service representative. The voice call between the user and the customer service representative may be established by utilizing various technologies for delivering voice, or multimedia, communications over a network (e.g., the Internet), such as Voice over IP (VoIP), for example.

In another example, while accessing a website, the user may be presented with content that is associated with an object (e.g., a button). In this example, the user can select the object to initiate a communication with an entity associated with the content. For example, the user may be browsing a social networking website that includes an electronic advertisement for carpet cleaning services. The electronic advertisement may include a button (e.g., "Click to Speak with a Sales Representative") that the user can select to initiate a voice call with a sales representative of the carpet cleaning company.

Under conventional approaches, the entity answering the user's voice call is typically unaware of any details pertaining to the user other than the information that is available as part of the user's caller identification ("caller ID"), such as a name and/or phone number. Thus, the entity answering the user's call will generally need to determine the nature of the user's call as well as any information about the user that may be useful in processing the user's inquiry. In some instances, the entity may benefit from accessing other contextual information about the user that may not be readily available, such as demographic information.

An improved approach overcomes the foregoing and other disadvantages associated with conventional approaches. In general, when a user initiates a communication, such as a voice call, to an entity, for example, by selecting a "Call Now" button on a website, systems and methods of the present disclosure can communicate various contextual information to the entity through an address, such as a phone number (e.g., (555) 555-0100), that is provided to the entity. For example, when the user initiates the voice call, the systems and methods of the present disclosure can associate, or encode, various information with a predetermined phone number. The information associated with the phone number may include, for example, information describing the content or website being accessed by the user, various information about the user, such as the user's demographics data, among other information.

When the voice call is being established, the systems and methods of the present disclosure can communicate the predetermined phone number to the entity answering the call, for example, by providing the phone number as part of the user's caller ID information. The phone number is typically shown to the entity answering the user's call, for example, through a caller ID display screen on the entity's computing device. The entity, or the computing device, can obtain, or decode, the various information that was associated with the phone number, for example, by using the phone number as a key to look up information that is associated with the phone number. In one example, the entity can utilize an application programming interface (API) to obtain the information associated with the phone number. By utilizing such an approach, various information about a user can be provided to entities using a phone number. Such information can be used by the entities to better service the user, for example, by providing a more targeted approach to sales or customer service.

FIG. 1 illustrates an example system 100 including an example server module 102 configured to facilitate communications between a client module 114 and a third-party module 116 over a network 130, according to an embodiment of the present disclosure. The client module 114 is configured to initiate communications through the server module 102 and the third-party module 116 is configured to receive communications initiated by the client module 114. As shown in the example of FIG. 1, the server module 102 can include a content distribution module 104 and a clickto-call module 106. In some instances, the example system 100 can include at least one data store 112. The components (e.g., modules, elements, etc.) shown in this figure and all figures herein are exemplary only, and other implementations may include additional, fewer, integrated, or different components. Some components may not be shown so as not to obscure relevant details.

In some embodiments, the server module 102, the client module 114, and/or the third-party module 116 can be implemented, in part or in whole, as software, hardware, or any combination thereof. In general, a module, as discussed herein, can be associated with software, hardware, or any combination thereof. In some implementations, one or more functions, tasks, and/or operations of modules can be carried out or performed by software routines, software processes, hardware, and/or any combination thereof. In some cases, the server module 102, the client module 114, and/or the third-party module 116, can be implemented, in part or in whole, as software running on one or more computing devices or systems, such as on a user- or client computing device. For example, the server module 102 or the client module 114 (or both), or at least a portion thereof, can be implemented as or within an application (e.g., app), a program, or an applet, etc, running on a user computing device or a client computing system, such as the user device 710 of FIG. 7. Further, the server module 102, or at least a portion thereof, can be implemented using one or more computing devices or systems that include one or more servers, such as network servers or cloud servers. In some instances, the server module 102 can, in part or in whole, be implemented within or configured to operate in conjunction with a social networking system (or service), such as the social networking system 730 of FIG. 7. Additionally, the third-party module 116, or at least a portion thereof, can be implemented using one or more computing devices or systems that include one or more servers, such as network servers or cloud servers. In some instances, the third-party module 116 can, in part or in whole, be implemented within or configured to operate in conjunction with a third-party system (or service), such as the external system 720 of FIG. 7. It should be understood that there can be many variations or other possibilities.

In some embodiments, the server module 102 can be configured to provide users with various content. For example, using the client module 114, a user can access content provided by the server module 102, for example, through a website. In such embodiments, the content distribution module 104 can be configured to provide users with various content, which can include electronic advertisements. Typically, using the client module 114, a user can select, or click, such electronic advertisements to access content associated with the advertisement, such as a website or a product web page, for example. In some instances, a content item, such as an electronic advertisement, may include one or more objects (e.g., button, image, text, etc.) that can be selected to initiate a communication, such as a voice communication (e.g., VoIP call), with a human, or computerized, phone operator of an organization associated with the object. For example, an electronic advertisement for a mobile phone company may include a button (e.g., "Click to Call") for calling a customer service representative of the company. In this example, a user operating a computing device can select the button to call a customer service representative of the mobile phone company.

In some instances, the content distribution module 104 can provide content, or electronic advertisements, as part of a news feed, such as a news feed corresponding to a user of a social networking system, for example. The news feed can be a sequential listing of content items that are deemed appropriate for access by the user. The news feed for the user can include myriad types of content items. Such content items can include, for example, images uploaded by others in the social network of the user, accounts of activities of connections of the user, articles regarding subject matter of interest to the user, advertisements directed to the user, etc. Among these content items can be content items, or electronic advertisements, that can be selected to establish a voice call with a respective entity associated with the content or electronic advertisements.

The click-to-call module 106 can be configured to establish a voice communication between the client module 114 (e.g., a user) and the click-to-call receiving module 118 (e.g., a human, or computerized, phone operator), for example, in response to the user selecting a "Click to Call" content item (e.g., electronic advertisement) or object (e.g., button). Typically, each content item and/or object for initiating a voice communication with an entity is associated with a respective phone number to be dialed. Further, each entity (e.g., a human, or computerized, phone operator) that receives voice communications can be associated with a respective third-party module 116. The third-party module 116 can include a click-to-call receiving module 118 that may be associated with one or more phone numbers and the click-to-call receiving module 118 can be configured to answer, or service, any voice communications (e.g., VoIP calls), that are directed to these phone numbers.

For example, an electronic advertisement for a mobile phone company may include a button for calling a customer service representative of the company, and that button may be associated with a phone number (555) 555-5555. When a user operating a computing device selects the button, the client module 114 in the computing device can send the click-to-call module 106 information describing the user's actions as well as the content item and/or object that was selected by the user. The click-to-call module 106 can be configured to establish the voice communication between the client module 114 and the click-to-call receiving module 118 using the phone number (555) 555-5555. The click-to-call receiving module 118 can determine when the click-to-call module 106 is attempting to establish a voice communication, and can apply generally known techniques (e.g., VoIP) for establishing the voice communication. When establishing the voice communication, the click-to-call receiving module 118 may perform various operations for routing the voice communication to an entity, such as a human, or computerized, phone operator. More details regarding the click-to-call module 106 and the click-to-call receiving module 118 will be provided below in reference to FIG. 2 and FIG. 3, respectively.

Although the examples throughout this disclosure make reference to voice communications, the approaches described herein may be applied to other forms of communication, such as instant messages, texts, e-mails, for example.

In some embodiments, the client module 114 can access content provided by the third-party module 116. In such embodiments, the third-party module 116 can provide content items and/or objects which, when selected, can initiate communications with phone operators associated with the third-party module 116. When such content items and/or objects are selected, the client module 114 and/or the third-party module 116 can be configured to execute software that notifies the server module 102 of the request for initiating a communication between the client module 114 and the third-party module 116. The server module 102 can be configured to utilize the approaches described herein to establish the communication between the client module 114 and the third-party module 116 as well as provide information to the third-party module 116 as described in this disclosure.

Furthermore, in some embodiments, the content distribution module 104 can be configured to communicate and/or operate with the at least one data store 112, as shown in the example system 100. The at least one data store 112 can be configured to store and maintain various types of data. In various embodiments, the at least one data store 112 can store content items (e.g., electronic advertisements) that have been associated with at least one address (e.g., phone number) so that when such content items, or respective objects associated with the content items, are selected, or clicked, the server module 102 can attempt to establish a voice communication with the third-party module 116 corresponding to that address (e.g., phone number). In some implementations, the at least one data store 112 can store information associated with the social networking system (e.g., the social networking system 730 of FIG. 7). The information associated with the social networking system can include data about users, social connections, social interactions, locations, geo-fenced areas, maps, places, events, pages, groups, posts, communications, content, feeds, account settings, privacy settings, a social graph, and various other types of data. In some implementations, the at least one data store 112 can store information associated with users, such as user identifiers, user information, profile information, user specified settings, content produced or posted by users, and various other types of user data. It should be appreciated that there can be many variations or other possibilities.

Figure 2:
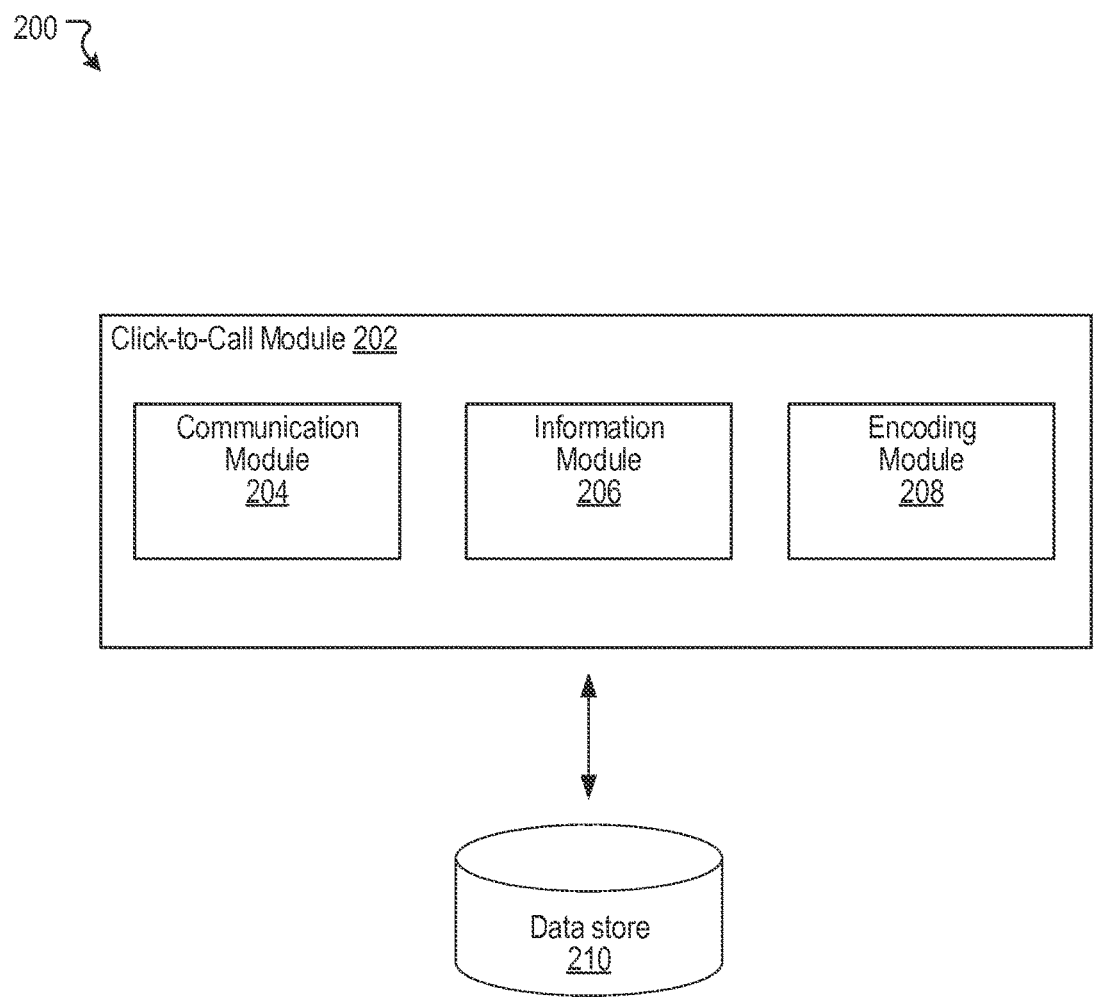
FIG. 2 illustrates an example click-to-call module configured to facilitate communications between a client module and a click-to-call receiving module, according to an embodiment of the present disclosure.

FIG. 2 illustrates an example click-to-call module 202 configured to facilitate communications between a client module and a click-to-call receiving module, for example, the client module 114 and the click-to-call receiving module 118 of FIG. 1, according to an embodiment of the present disclosure. In some embodiments, the click-to-call module 106 of FIG. 1 can be implemented with the click-to-call module 202. As shown in the example of FIG. 2, the click-to-call module 202 can include a communication module 204, an information module 206, and an encoding module 208.

The communication module 204 can be configured to utilize various technologies for receiving and/or delivering voice, or multimedia, communications over a network (e.g., the Internet), such as Voice over IP (VoIP), for example. When a user operating a computing device initiates a voice communication through the server module 102 of FIG. 1, for example, by selecting an electronic advertisement, the communication module 204 can establish the voice communication using an address associated with the electronic advertisement. In some instances, the address used to establish the voice communication may be a phone number, a Uniform Resource Locator (URL), an e-mail address, or some other address for routing traffic in a network, such as an Internet Protocol (IP) address.

The information module 206 can be configured to determine any information that is to be communicated to the entity with whom the voice communication is being established, such as an entity associated with the third-party module 116 of FIG. 1. This information can be communicated by associating, or encoding, the information with an address, or phone number, as described below in reference to the encoding module 208. As mentioned, the server module 102 of FIG. 1 may be implemented in a content distribution system or a social networking system, for example.

In various embodiments, the information to be communicated may include, for example, information about the user, such as the user's demographics segments, the computing device of the user, such as a make and/or model of the computing device, the user's network experience, such as a level of quality that the user has experienced with respect to network-based voice communications and/or data transmissions, the network carrier being used by the computing device of the user, such as a name of a phone company or an Internet service provider, among other information. The information describing the user may be determined, for example, based at least in part on the user's interactions with such a content distribution system or social networking system. In some instances, this information to be communicated can include information about the entity that provided the content item to be presented to the user, such as the organization that provided the electronic advertisement, whose selection triggered the voice communication. Such information may also include an identifier that references the entity (e.g., "Partner ID"), an identifier that references the content item (e.g., "Advertisement ID"), as well as an identifier referencing any advertising campaign with which the content item is associated (e.g., "Campaign ID"), for example.

In some embodiments, the information module 206 can be configured to limit the amount of user information that is sent based at least in part on targeting segments associated with the content item that was selected by the user to trigger the communication. For example, an electronic advertisement for golf clubs may target users who are male and in the 35-65 age group. The electronic advertisement may provide an option for initiating a voice communication with a customer service representative. In this example, if a user were to trigger a voice communication by selecting the option, the information provided to the customer service representative (in the form of an address or phone number) can be limited to the user's gender and age group.

In some implementations, the network carrier being utilized by the computing device of the user can also provide various information to be communicated. For example, the client module 114 of FIG. 1 may be implemented in a mobile device of a user and the mobile device may be utilizing a network carrier (e.g., mobile phone company) to access the server module 102 of FIG. 1. In such instances, the network carrier can provide various information to the server module 102 of FIG. 1, for example, by injecting such information into a Hypertext Transfer Protocol (HTTP) header that is communicated to the server module 102 of FIG. 1. The information provided can include, for example, information describing attributes of the user, such as a rating indicating an importance of the user (e.g., whether the user is a high value or low value subscriber), whether the user is using a prepaid or postpaid mobile device, an amount of time remaining before the user's contract expires, among other information describing the user's experience and/or relationship with the network carrier.

The encoding module 208 can be configured to associate the information determined by the information module 206 with an address, or phone number, so that the information can be communicated to the entity receiving the call to initiate voice communication.

In some embodiments, a set of addresses can be allocated for purposes of communicating information as described herein. In such embodiments, when a user initiates a voice call to an entity, the encoding module 208 can select an address, such as a phone number (e.g., (555) 555-0101), from a collection of phone numbers, and can associate various information, such as information about the user, with the selected phone number (555) 555-0101. Such associations, or correlations, can be saved, for example, in the data store 210, using any generally known approaches for associating data. When the voice call is being established, the click-to-call module 202 can provide the selected phone number (555) 555-0101 to the entity receiving the voice call, for example, in the caller ID information that is sent to the computing device of the entity. Thus, in such embodiments, the caller ID information does not include the user's actual phone number but rather does include the phone number that was selected by the encoding module 208. The entity receiving the voice call can utilize the phone number provided ((555) 555-0101) to obtain the information associated with the phone number, as described in reference to the click-to-call receiving module 302 of FIG. 3. In some embodiments, the caller ID information can include the user's actual phone number, for example, so that the entity receiving the call can identify repeat callers or have the user's callback phone number.

In some embodiments, addresses in a set of addresses (e.g., phone numbers) can be assigned to one or more categories or attributes. For example, a first set of phone numbers can include phone numbers ranging from (555) 555-0100 to (555) 555-0200 and a second set of phone numbers can include phone numbers ranging from (555) 555-0201 to (555) 555-0300. In this example, phone numbers in the first set of phone numbers can be associated with the attributes "age 25-44" and "high spender." Meanwhile, phone numbers in the second set of phone numbers can be associated with the attributes "age 45-60" and "high spender." In such embodiments, when a user initiates a voice call to an entity, the encoding module 208 can determine which attributes correspond to the user, for example, based at least in part on the information provided by the information module 206. The encoding module 208 can select a phone number that corresponds to the user's information and the click-to-call module 202 can provide the selected phone number to the entity receiving the voice call, for example, in the caller ID information that is sent to the computing device of the entity. For example, if the encoding module 208 determines that the user corresponds to the "age 25-44" and the "high spender" categories, then the encoding module 208 can assign the user one of the available phone numbers (e.g., (555) 555-0102) from the first set of phone numbers. The entity receiving the voice call can determine any information (e.g., categories or attributes) corresponding to the user based at least in part on the phone number provided by the click-to-call module 202, as described in reference to the click-to-call receiving module 302 of FIG. 3.

In some embodiments, a set of addresses can be allocated so as to indicate a priority, or urgency, of a communication. In such embodiments, when selecting an address for associating information, the encoding module 208 can be configured to select the address based on a priority, or urgency, of the voice communication. For example, a first set of phone numbers (e.g., (555) 555-0100 to (555) 555-0200) can be allocated for high priority calls while a second set of phone numbers (e.g., (555) 555-0201 to (555) 555-0300) can be allocated for low priority calls. In this example, based on the information describing a user (e.g., "high value subscriber"), the encoding module 208 can determine that the user's call should be prioritized over other calls by the entity receiving the user's call and, as a result, the encoding module 208 can assign the user a phone number from the first set of phone numbers. The entity receiving the call can access information describing the respective associations between phone numbers and priority levels to determine that the call is high priority, since the phone number provided with the call is from the first set of phone numbers.

Figure 3:
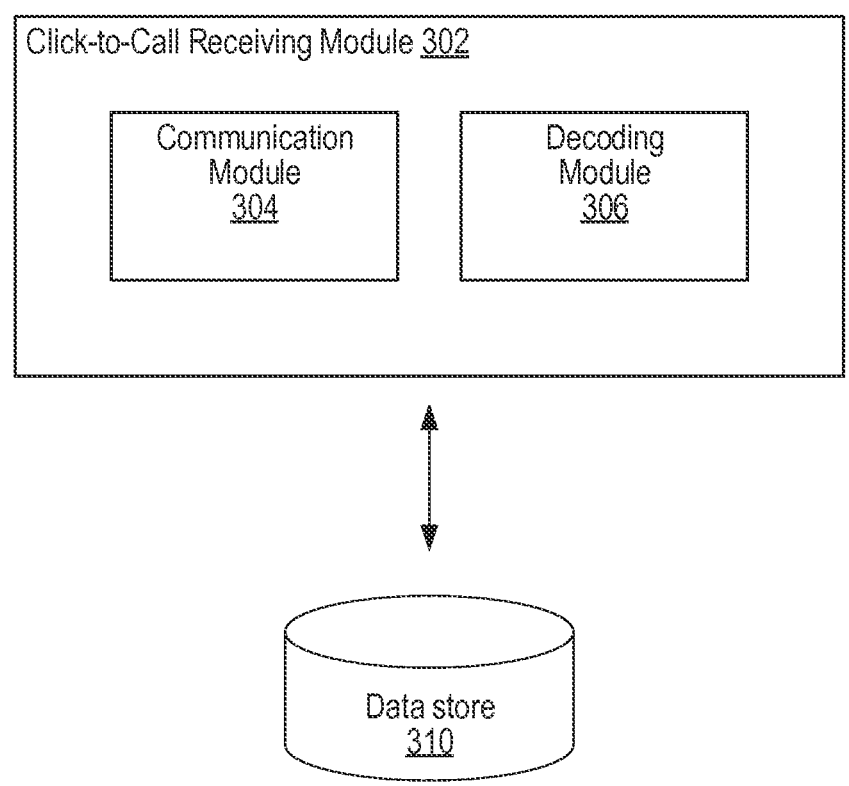
FIG. 3 illustrates an example click-to-call receiving module configured to receive communications initiated through a click-to-call module, according to an embodiment of the present disclosure.

FIG. 3 illustrates an example click-to-call receiving module 302 configured to receive communications initiated through the click-to-call module 202 of FIG. 2, according to an embodiment of the present disclosure. In some embodiments, the click-to-call receiving module 118 of FIG. 1 can be implemented with the click-to-call receiving module 302. As shown in the example of FIG. 3, the click-to-call receiving module 302 can include a communication module 304 and a decoding module 306.

The communication module 304 can be configured to utilize various technologies for receiving and/or delivering voice, or multimedia, communications over a network (e.g., the Internet), as described above in reference to FIG. 2. The communication module 304 can also determine when the click-to-call module 202 of FIG. 2 is attempting to establish a connection for a communication. Further, once the connection is established, the communication module 304 can be configured to route the communication to an appropriate entity such as a human, or automated, phone operator.

The decoding module 306 can be configured to extract any information associated with addresses or phone numbers provided to the click-to-call receiving module 302. For example, the communication module 304 may receive information describing a phone number that was provided with a voice communication received by the click-to-call receiving module 302. In one example, such information may be provided to the click-to-call receiving module 302 as caller ID information. The decoding module 306 can be configured to use the phone number to determine, or look up, any information associated with the phone number.

In some embodiments, the server module 102 of FIG. 1 is configured to provide an interface (e.g., a web-based interface and/or an application programming interface (API)) that can be accessed by the decoding module 306 for purposes of obtaining information associated with phone numbers. In such embodiments, the decoding module 306 can access the interface to obtain any information associated with a phone number.

As mentioned, in some embodiments, phone numbers in a set of phone numbers can be allocated to correspond to one or more categories or attributes. For example, a first set of phone numbers can include phone numbers ranging from (555) 555-0400 to (555) 555-0500 and a second set of phone numbers can include phone numbers ranging from (555) 555-0501 to (555) 555-0600. In this example, phone numbers in the first set of phone numbers can be associated with a first set of attributes and the phone numbers in the second set of phone numbers can be associated with a second set of attributes. The decoding module 306 can be configured to obtain information describing such associations and such information may be accessible through the data store 310, for example. In such embodiments, when obtaining information associated with a phone number, the decoding module 306 can determine the set of phone numbers to which the phone number corresponds, and can then obtain any information associated with that set of phone numbers. Using the example above, for a phone number (555) 555-0401, the decoding module 306 can determine that the phone number corresponds to the first set of phone numbers and, accordingly, can determine that the first set of attributes apply to a user for which the phone number (555) 555-0401 was provided.

Information decoded, or extracted, from addresses, such as phone numbers, can be used by a phone operator to better process the communication. In some embodiments, the information can be used to better process the communication through an automated phone answering system. For example, automated phone answering systems are typically configured to operate based on decision trees that route calls to an appropriate phone operator. In such embodiments, the decoded information can be used to automatically route the call through the decision trees. For example, if a user clicked on an electronic advertisement for a special offer on a washing machine appliance, then this information can be provided to an automated phone answering system through a phone number. The automated phone answering system can determine that the user is interested in the washing machine appliance and that the user has seen the special offer. Based on this determination, the automated phone answering system can automatically route the call to the appropriate phone operator so that the user is connected with the phone operator without having to manually input additional information.

Figure 4:
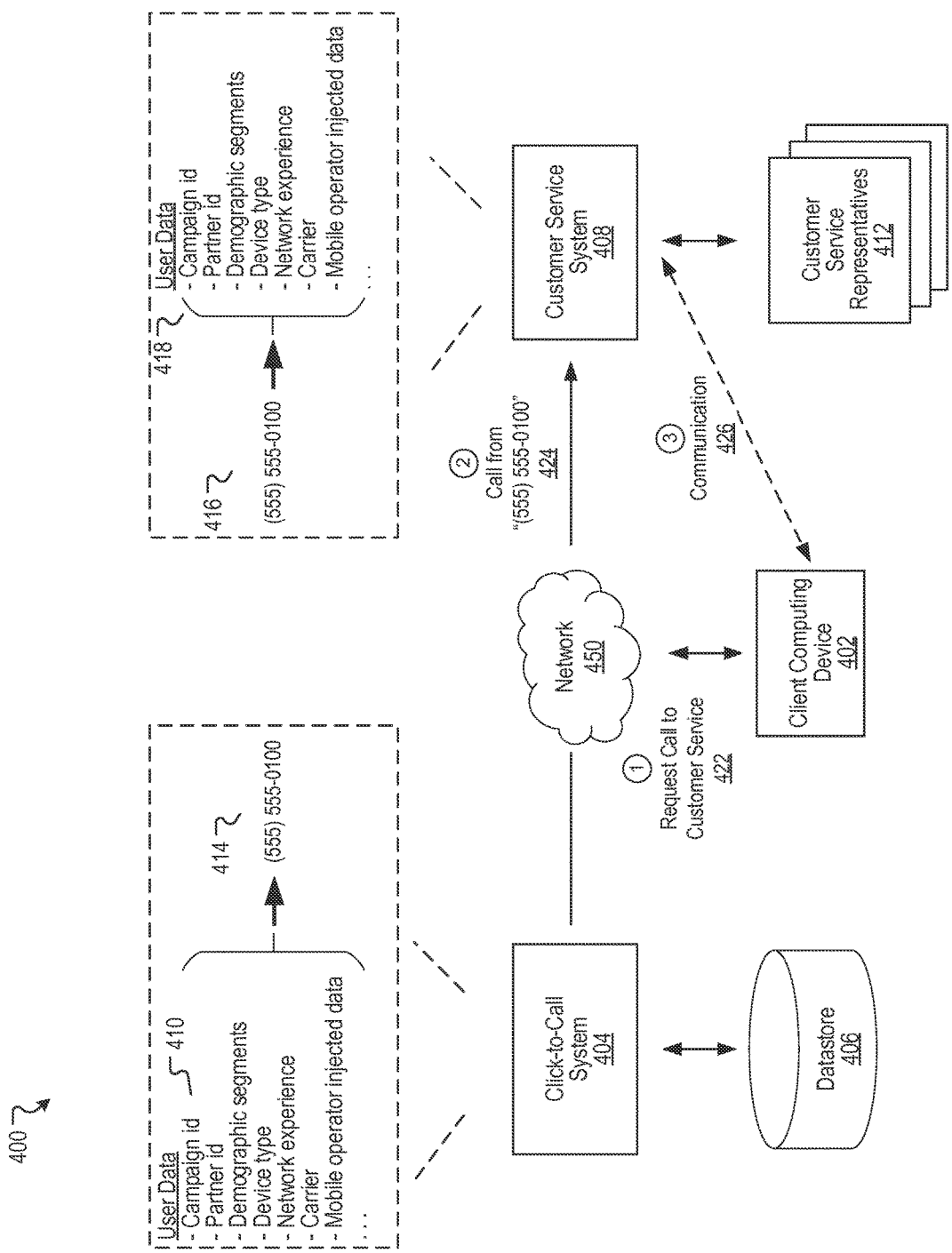
FIG. 4 illustrates an example scenario of communicating user information, according to various embodiments of the present disclosure.

FIG. 4 illustrates an example scenario 400 of communicating user information 410, according to various embodiments of the present disclosure. The example scenario 400 illustrates a client computing device 402 interacting with a click-to-call system 404 over a network 450 (e.g., the Internet). The client computing device 402 includes the client module 114 of FIG. 1. The click-to-call system 404 includes the content distribution module 104 and the click-to-call module 106 of FIG. 1. Further, the customer service system 408 includes the click-to-call receiving module 118 of FIG. 1.

In FIG. 4, a user operating the client computing device 402 is accessing content (e.g., a website) through the click-to-call system 404 and such content includes an electronic advertisement. The electronic advertisement may provide an option (e.g., "Click to Call") for initiating a voice communication, for example, over the network 450, with a customer service system 408 that is associated with the electronic advertisement. When the user selects the option for initiating the voice communication, the client computing device 402 sends 422 a request to the click-to-call system 404 over the network 450.

The click-to-call system 404 can determine, from the request, that the user has selected the option for initiating the voice communication with the customer service system 408. The click-to-call system 404 can also determine a phone number associated with the customer service system 408. For example, the data store 406 can store various information describing content items, such as electronic advertisements, that provide an option for initiating a communication as well as any respective addresses or phone numbers associated with the content items. Further, the click-to-call system 404 can apply generally known techniques (e.g., VoIP) for establishing the voice communication 426 between the client computing device 402 and the customer service system 408.

When establishing the voice communication, the click-to-call system 404 can also provide the customer service system 408 with various information, such as information 410, which can include information about the user operating the client computing device 402. The customer service system 408 can be configured to route the communication to a customer service representative 412 associated with the customer service system 408. Such information 410 may be useful to the customer service system 408, or a customer service representative 412, for processing the user's voice communication, for example. In some embodiments, the click-to-call system 404 can associate various information with a phone number 414, as described above. This phone number may be selected from a set of reusable phone numbers that are allocated for purposes of communicating information as described herein. Further, when establishing the voice communication, this phone number can be provided 424 to the customer service system 408, for example, in the caller ID information sent to the customer service system 408. The customer service system 408 can determine any information 418 associated with the phone number 416 by decoding the phone number 416, for example, using the various approaches as described above in reference to FIG. 3.

Figure 5:
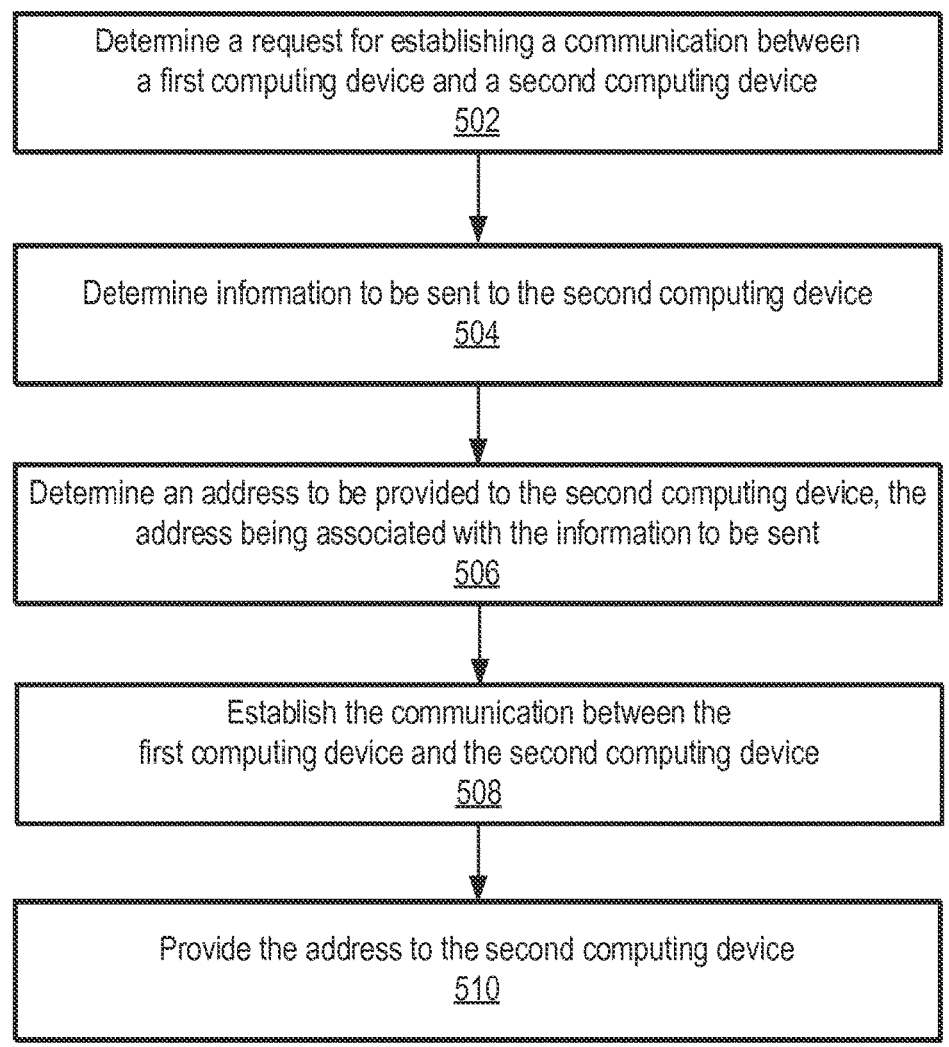
FIG. 5 illustrates an example method that depicts the encoding and sending of information, according to an embodiment of the present disclosure.

FIG. 5 illustrates an example method 500 that depicts the encoding and sending of information, according to an embodiment of the present disclosure. It should be appreciated that there can be additional, fewer, or alternative steps performed in similar or alternative orders, or in parallel, within the scope of the various embodiments discussed herein unless otherwise stated.

At block 502, the example method 500 can determine a request for establishing a communication between a first computing device and a second computing device. For example, the request may be initiated when a user operating the first computing device selects a "click to call" option associated with an electronic advertisement. The "click to call" option can be configured to establish a communication with the second computing device, which can route the communication to a customer service representative, for example. At block 504, the method 500 can determine information to be sent to the second computing device. The information to be sent can include various information describing a user operating the first computing device, for example, among other types of information, as described above.

At block 506, the method 500 can determine an available address (e.g., phone number) to be used for communicating the information to the second computing device. As described above, the address can be associated with the information to be sent to the second computing device. At block 508, the method 500 establishes the communication between the first computing device and the second computing device. In some embodiments, the communication is a voice communication that can be established using generally known techniques for network-based communications, such as VoIP. At block 510, the method 500 provides the address to the second computing device. The second computing device can utilize the address to obtain the information associated with the address, as described above. Other suitable techniques are possible.

Figure 6:
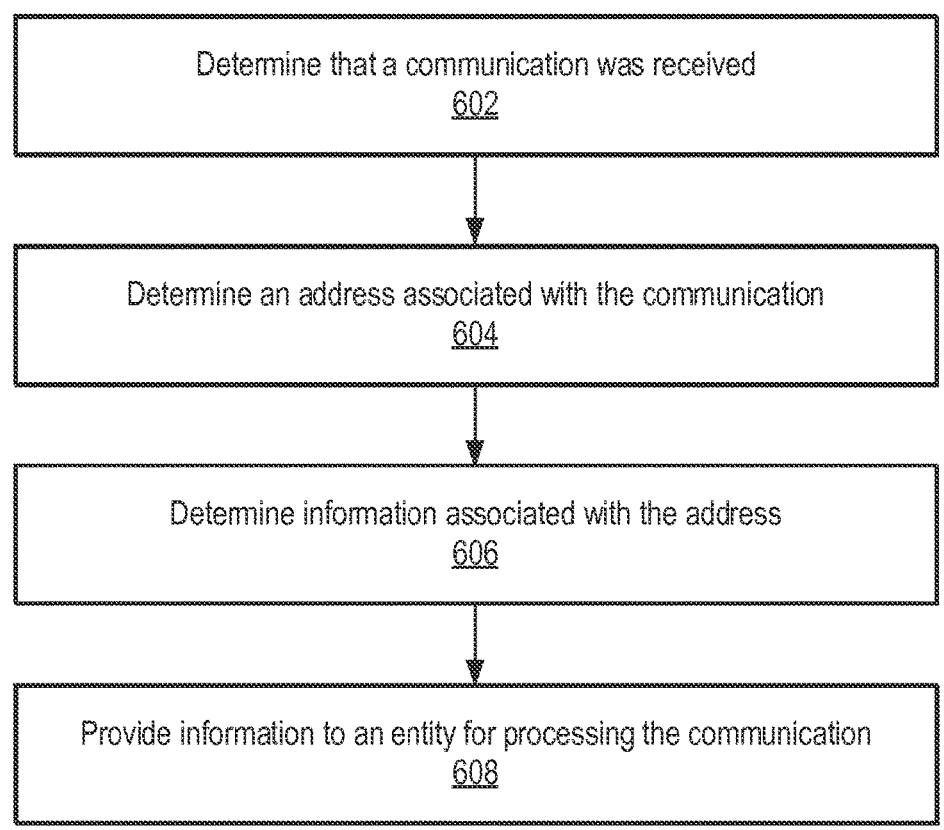
FIG. 6 illustrates an example method that depicts the receiving and decoding of information, according to an embodiment of the present disclosure.

FIG. 6 illustrates an example method 600 that depicts the receiving and decoding of information, according to an embodiment of the present disclosure. It should be appreciated that there can be additional, fewer, or alternative steps performed in similar or alternative orders, or in parallel, within the scope of the various embodiments discussed herein unless otherwise stated.

At block 602, the example method 600 can determine that a communication was received. At block 604, the method 600 can determine an address (e.g., a phone number) that is associated with the communication. The address, or phone number, can be provided with the caller ID information associated with the communication, for example. At block 606, the method 600 can determine any information associated with the address, or phone number. In one embodiment, the information may be obtained through an interface (e.g., a web-based interface, an API, etc.). In another embodiment, the address, or phone number, can be pre-assigned to represent certain types of information (e.g., categories or attributes), as described above, and the method can determine the information based on the address, or phone number, alone. At block 608, the method can provide the information to an entity (e.g., a human, or computerized, phone operator) for further processing of the communication. Other suitable techniques are possible.

It is contemplated that there can be many other uses, applications, and/or variations associated with the various embodiments of the present disclosure. For example, in some cases, user can choose whether or not to opt-in to utilize the disclosed technology. The disclosed technology can also ensure that various privacy settings and preferences are maintained and can prevent private information from being divulged. In another example, various embodiments of the present disclosure can learn, improve, and/or be refined over time.

Social Networking System—Example Implementation

Figure 7:
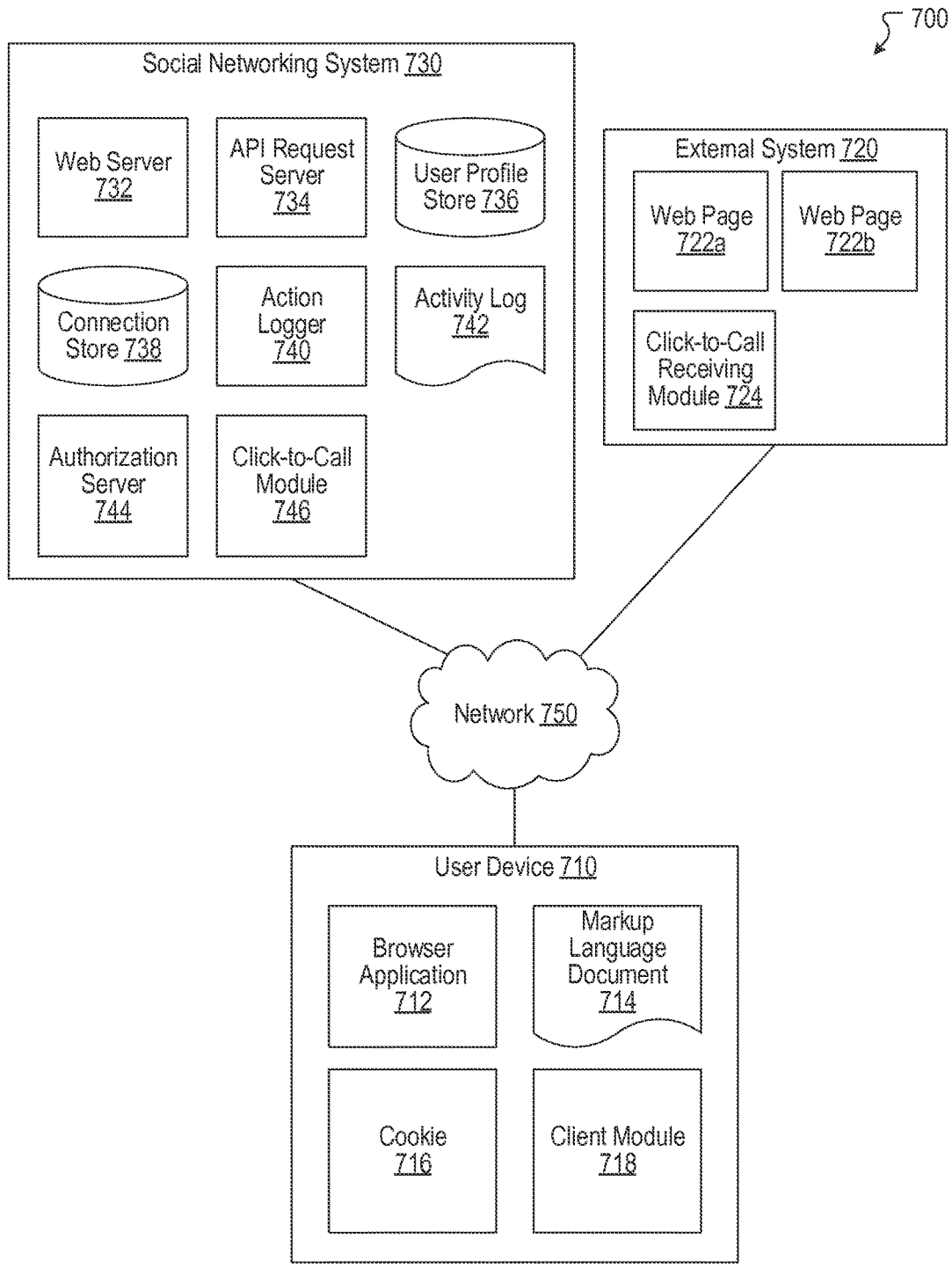
FIG. 7 illustrates a network diagram of an example system including an example social networking system that can be utilized in various scenarios, according to an embodiment of the present disclosure.

FIG. 7 illustrates a network diagram of an example system 700 that can be utilized in various scenarios, in accordance with an embodiment of the present disclosure. The system 700 includes one or more user devices 710, one or more external systems 720, a social networking system (or service) 730, and a network 750. In an embodiment, the social networking service, provider, and/or system discussed in connection with the embodiments described above may be implemented as the social networking system 730. For purposes of illustration, the embodiment of the system 700, shown by FIG. 7, includes a single external system 720 and a single user device 710. However, in other embodiments, the system 700 may include more user devices 710 and/or more external systems 720. In certain embodiments, the social networking system 730 is operated by a social network provider, whereas the external systems 720 are separate from the social networking system 730 in that they may be operated by different entities. In various embodiments, however, the social networking system 730 and the external systems 720 operate in conjunction to provide social networking services to users (or members) of the social networking system 730. In this sense, the social networking system 730 provides a platform or backbone, which other systems, such as external systems 720, may use to provide social networking services and functionalities to users across the Internet.

The user device 710 comprises one or more computing devices (or systems) that can receive input from a user and transmit and receive data via the network 750. In one embodiment, the user device 710 is a conventional computer system executing, for example, a Microsoft Windows compatible operating system (OS), Apple OS X, and/or a Linux distribution. In another embodiment, the user device 710 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 710 is configured to communicate via the network 750. The user device 710 can execute an application, for example, a browser application that allows a user of the user device 710 to interact with the social networking system 730. In another embodiment, the user device 710 interacts with the social networking system 730 through an application programming interface (API) provided by the native operating system of the user device 710, such as iOS and ANDROID. The user device 710 is configured to communicate with the external system 720 and the social networking system 730 via the network 750, which may comprise any combination of local area and/or wide area networks, using wired and/or wireless communication systems.

In one embodiment, the network 750 uses standard communications technologies and protocols. Thus, the network 750 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 750 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 750 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 710 may display content from the external system 720 and/or from the social networking system 730 by processing a markup language document 714 received from the external system 720 and from the social networking system 730 using a browser application 712. The markup language document 714 identifies content and one or more instructions describing formatting or presentation of the content. By executing the instructions included in the markup language document 714, the browser application 712 displays the identified content using the format or presentation described by the markup language document 714. For example, the markup language document 714 includes instructions for generating and displaying a web page having multiple frames that include text and/or image data retrieved from the external system 720 and the social networking system 730. In various embodiments, the markup language document 714 comprises a data file including extensible markup language (XML) data, extensible hypertext markup language (XHTML) data, or other markup language data. Additionally, the markup language document 714 may include JavaScript Object Notation (JSON) data, JSON with padding (JSONP), and JavaScript data to facilitate data-interchange between the external system 720 and the user device 710. The browser application 712 on the user device 710 may use a JavaScript compiler to decode the markup language document 714.

The markup language document 714 may also include, or link to, applications or application frameworks such as FLASH™ or Unity™ applications, the Silverlight™ application framework, etc.

In one embodiment, the user device 710 also includes one or more cookies 716 including data indicating whether a user of the user device 710 is logged into the social networking system 730, which may enable modification of the data communicated from the social networking system 730 to the user device 710.

The external system 720 includes one or more web servers that include one or more web pages 722a, 722b, which are communicated to the user device 710 using the network 750. The external system 720 is separate from the social networking system 730. For example, the external system 720 is associated with a first domain, while the social networking system 730 is associated with a separate social networking domain. Web pages 722a, 722b, included in the external system 720, comprise markup language documents 714 identifying content and including instructions specifying formatting or presentation of the identified content. As discussed previously, it should be appreciated that there can be many variations or other possibilities.

The social networking system 730 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 730 may be administered, managed, or controlled by an operator. The operator of the social networking system 730 may be a human being, an automated application, or a series of applications for managing content, regulating policies, and collecting usage metrics within the social networking system 730. Any type of operator may be used.

Users may join the social networking system 730 and then add connections to any number of other users of the social networking system 730 to whom they desire to be connected. As used herein, the term "friend" refers to any other user of the social networking system 730 to whom a user has formed a connection, association, or relationship via the social networking system 730. For example, in an embodiment, if users in the social networking system 730 are represented as nodes in the social graph, the term "friend" can refer to an edge formed between and directly connecting two user nodes.

Connections may be added explicitly by a user or may be automatically created by the social networking system 730 based on common characteristics of the users (e.g., users who are alumni of the same educational institution). For example, a first user specifically selects a particular other user to be a friend. Connections in the social networking system 730 are usually in both directions, but need not be, so the terms "user" and "friend" depend on the frame of reference. Connections between users of the social networking system 730 are usually bilateral ("two-way"), or "mutual," but connections may also be unilateral, or "one-way." For example, if Bob and Joe are both users of the social networking system 730 and connected to each other, Bob and Joe are each other's connections. If, on the other hand, Bob wishes to connect to Joe to view data communicated to the social networking system 730 by Joe, but Joe does not wish to form a mutual connection, a unilateral connection may be established. The connection between users may be a direct connection; however, some embodiments of the social networking system 730 allow the connection to be indirect via one or more levels of connections or degrees of separation.

In addition to establishing and maintaining connections between users and allowing interactions between users, the social networking system 730 provides users with the ability to take actions on various types of items supported by the social networking system 730. These items may include groups or networks (i.e., social networks of people, entities, and concepts) to which users of the social networking system 730 may belong, events or calendar entries in which a user might be interested, computer-based applications that a user may use via the social networking system 730, transactions that allow users to buy or sell items via services provided by or through the social networking system 730, and interactions with advertisements that a user may perform on or off the social networking system 730. These are just a few examples of the items upon which a user may act on the social networking system 730, and many others are possible. A user may interact with anything that is capable of being represented in the social networking system 730 or in the external system 720, separate from the social networking system 730, or coupled to the social networking system 730 via the network 750.

The social networking system 730 is also capable of linking a variety of entities. For example, the social networking system 730 enables users to interact with each other as well as external systems 720 or other entities through an API, a web service, or other communication channels. The social networking system 730 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 730. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 730 modifies edges connecting the various nodes to reflect the relationships and interactions.

The social networking system 730 also includes user-generated content, which enhances a user's interactions with the social networking system 730. User-generated content may include anything a user can add, upload, send, or "post" to the social networking system 730. For example, a user communicates posts to the social networking system 730 from a user device 710. Posts may include data such as status updates or other textual data, location information, images such as photos, videos, links, music or other similar data and/or media. Content may also be added to the social networking system 730 by a third party. Content "items" are represented as objects in the social networking system 730. In this way, users of the social networking system 730 are encouraged to communicate with each other by posting text and content items of various types of media through various communication channels. Such communication increases the interaction of users with each other and increases the frequency with which users interact with the social networking system 730.

The social networking system 730 includes a web server 732, an API request server 734, a user profile store 736, a connection store 738, an action logger 740, an activity log 742, and an authorization server 744. In an embodiment of the invention, the social networking system 730 may include additional, fewer, or different components for various applications. Other components, such as network interfaces, security mechanisms, load balancers, failover servers, management and network operations consoles, and the like are not shown so as to not obscure the details of the system.

The user profile store 736 maintains information about user accounts, including biographic, demographic, and other types of descriptive information, such as work experience, educational history, hobbies or preferences, location, and the like that has been declared by users or inferred by the social networking system 730. This information is stored in the user profile store 736 such that each user is uniquely identified. The social networking system 730 also stores data describing one or more connections between different users in the connection store 738. The connection information may indicate users who have similar or common work experience, group memberships, hobbies, or educational history. Additionally, the social networking system 730 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 730, such as non-person entities, buckets, cluster centers, images, interests, pages, external systems, concepts, and the like are also stored in the connection store 738.

The social networking system 730 maintains data about objects with which a user may interact. To maintain this data, the user profile store 736 and the connection store 738 store instances of the corresponding type of objects maintained by the social networking system 730. Each object type has information fields that are suitable for storing information appropriate to the type of object. For example, the user profile store 736 contains data structures with fields suitable for describing a user's account and information related to a user's account. When a new object of a particular type is created, the social networking system 730 initializes a new data structure of the corresponding type, assigns a unique object identifier to it, and begins to add data to the object as needed. This might occur, for example, when a user becomes a user of the social networking system 730, the social networking system 730 generates a new instance of a user profile in the user profile store 736, assigns a unique identifier to the user account, and begins to populate the fields of the user account with information provided by the user.

The connection store 738 includes data structures suitable for describing a user's connections to other users, connections to external systems 720 or connections to other entities. The connection store 738 may also associate a connection type with a user's connections, which may be used in conjunction with the user's privacy setting to regulate access to information about the user. In an embodiment of the invention, the user profile store 736 and the connection store 738 may be implemented as a federated database.

Data stored in the connection store 738, the user profile store 736, and the activity log 742 enables the social networking system 730 to generate the social graph that uses nodes to identify various objects and edges connecting nodes to identify relationships between different objects. For example, if a first user establishes a connection with a second user in the social networking system 730, user accounts of the first user and the second user from the user profile store 736 may act as nodes in the social graph. The connection between the first user and the second user stored by the connection store 738 is an edge between the nodes associated with the first user and the second user. Continuing this example, the second user may then send the first user a message within the social networking system 730. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 730 (or, alternatively, in an image maintained by another system outside of the social networking system 730). The image may itself be represented as a node in the social networking system 730. This tagging action may create edges between the first user and the second user as well as create an edge between each of the users and the image, which is also a node in the social graph. In yet another example, if a user confirms attending an event, the user and the event are nodes obtained from the user profile store 736, where the attendance of the event is an edge between the nodes that may be retrieved from the activity log 742. By generating and maintaining the social graph, the social networking system 730 includes data describing many different types of objects and the interactions and connections among those objects, providing a rich source of socially relevant information.

The web server 732 links the social networking system 730 to one or more user devices 710 and/or one or more external systems 720 via the network 750. The web server 732 serves web pages, as well as other web-related content, such as Java, JavaScript, Flash, XML, and so forth. The web server 732 may include a mail server or other messaging functionality for receiving and routing messages between the social networking system 730 and one or more user devices 710. The messages can be instant messages, queued messages (e.g., email), text and SMS messages, or any other suitable messaging format.

The API request server 734 allows one or more external systems 720 and user devices 710 to call access information from the social networking system 730 by calling one or more API functions. The API request server 734 may also allow external systems 720 to send information to the social networking system 730 by calling APIs. The external system 720, in one embodiment, sends an API request to the social networking system 730 via the network 750, and the API request server 734 receives the API request. The API request server 734 processes the request by calling an API associated with the API request to generate an appropriate response, which the API request server 734 communicates to the external system 720 via the network 750. For example, responsive to an API request, the API request server 734 collects data associated with a user, such as the user's connections that have logged into the external system 720, and communicates the collected data to the external system 720. In another embodiment, the user device 710 communicates with the social networking system 730 via APIs in the same manner as external systems 720.

The action logger 740 is capable of receiving communications from the web server 732 about user actions on and/or off the social networking system 730. The action logger 740 populates the activity log 742 with information about user actions, enabling the social networking system 730 to discover various actions taken by its users within the social networking system 730 and outside of the social networking system 730. Any action that a particular user takes with respect to another node on the social networking system 730 may be associated with each user's account, through information maintained in the activity log 742 or in a similar database or other data repository. Examples of actions taken by a user within the social networking system 730 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 730, the action is recorded in the activity log 742. In one embodiment, the social networking system 730 maintains the activity log 742 as a database of entries. When an action is taken within the social networking system 730, an entry for the action is added to the activity log 742. The activity log 742 may be referred to as an action log.

Additionally, user actions may be associated with concepts and actions that occur within an entity outside of the social networking system 730, such as an external system 720 that is separate from the social networking system 730. For example, the action logger 740 may receive data describing a user's interaction with an external system 720 from the web server 732. In this example, the external system 720 reports a user's interaction according to structured actions and objects in the social graph.

Other examples of actions where a user interacts with an external system 720 include a user expressing an interest in an external system 720 or another entity, a user posting a comment to the social networking system 730 that discusses an external system 720 or a web page 722a within the external system 720, a user posting to the social networking system 730 a Uniform Resource Locator (URL) or other identifier associated with an external system 720, a user attending an event associated with an external system 720, or any other action by a user that is related to an external system 720. Thus, the activity log 742 may include actions describing interactions between a user of the social networking system 730 and an external system 720 that is separate from the social networking system 730.

The authorization server 744 enforces one or more privacy settings of the users of the social networking system 730. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 720, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 720. One embodiment allows the specification of the set of entities to comprise an enumeration of entities. For example, the user may provide a list of external systems 720 that are allowed to access certain information. Another embodiment allows the specification to comprise a set of entities along with exceptions that are not allowed to access the information. For example, a user may allow all external systems 720 to access the user's work information, but specify a list of external systems 720 that are not allowed to access the work information. Certain embodiments call the list of exceptions that are not allowed to access certain information a "block list". External systems 720 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 744 contains logic to determine if certain information associated with a user can be accessed by a user's friends, external systems 720, and/or other applications and entities. The external system 720 may need authorization from the authorization server 744 to access the user's more private and sensitive information, such as the user's work phone number. Based on the user's privacy settings, the authorization server 744 determines if another user, the external system 720, an application, or another entity is allowed to access information associated with the user, including information about actions taken by the user.

In some embodiments, the user device 710 can include a client module 718. The client module 718 can, for example, be implemented as the client module 114 of FIG. 1. In some embodiments, the social networking system 730 can include a click-to-call module 746. The click-to-call module 746 can, for example, be implemented as the click-to-call module 202 of FIG. 2. In some embodiments, the external system 720 can include a click-to-call receiving module 724. The click-to-call receiving module 724 can, for example, be implemented as the click-to-call receiving module 302 of FIG. 3. As discussed previously, it should be appreciated that there can be many variations or other possibilities.

Hardware Implementation

Figure 8:
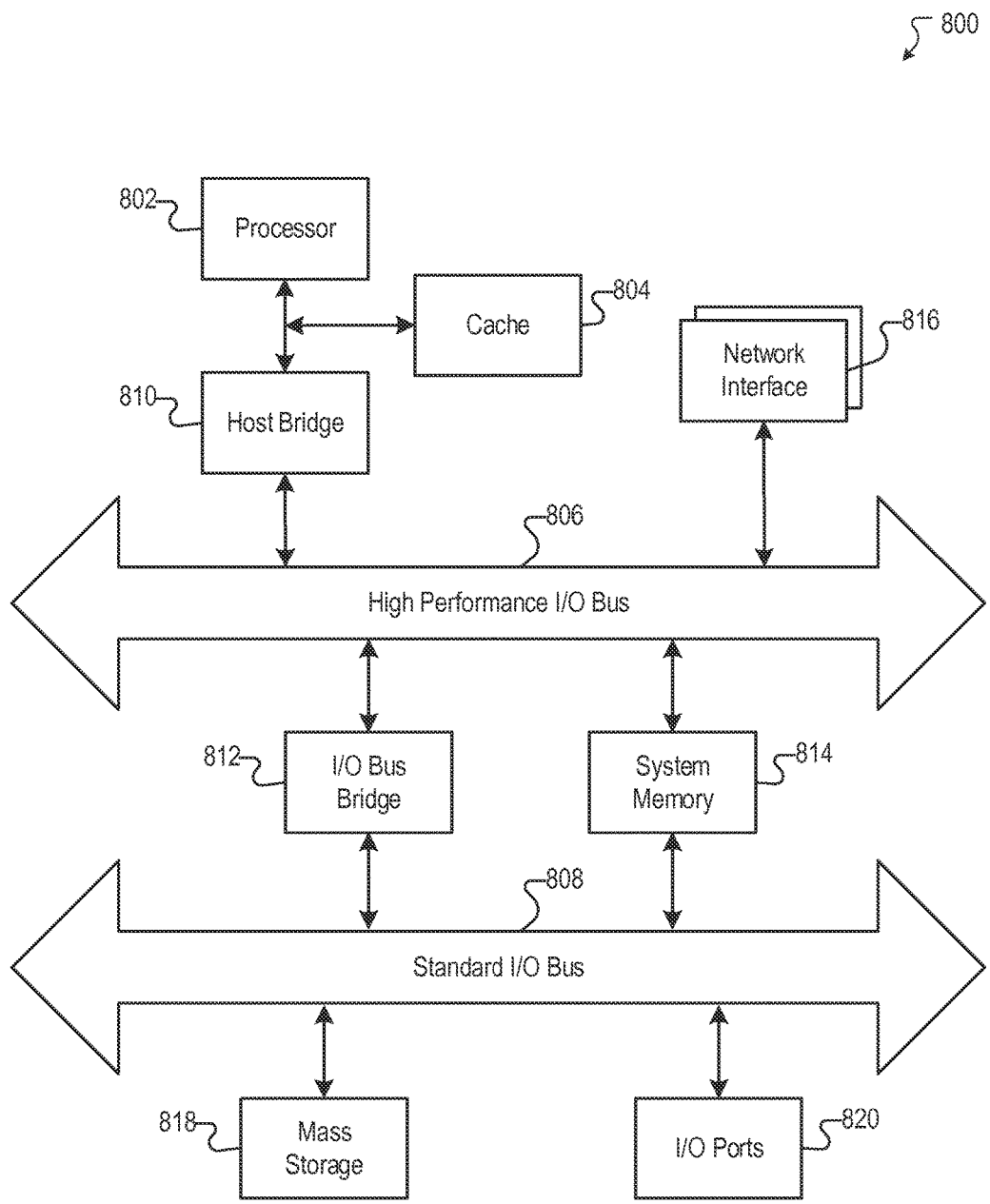
FIG. 8 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 8 illustrates an example of a computer system 800 that may be used to implement one or more of the embodiments described herein in accordance with an embodiment of the invention. The computer system 800 includes sets of instructions for causing the computer system 800 to perform the processes and features discussed herein. The computer system 800 may be connected (e.g., networked) to other machines. In a networked deployment, the computer system 800 may operate in the capacity of a server machine or a client machine in a client-server network environment, or as a peer machine in a peer-to-peer (or distributed) network environment. In an embodiment of the invention, the computer system 800 may be the social networking system 730, the user device 710, and the external system 820, or a component thereof. In an embodiment of the invention, the computer system 800 may be one server among many that constitutes all or part of the social networking system 730.

The computer system 800 includes a processor 802, a cache 804, and one or more executable modules and drivers, stored on a computer-readable medium, directed to the processes and features described herein. Additionally, the computer system 800 includes a high performance input/output (I/O) bus 806 and a standard I/O bus 808. A host bridge 810 couples processor 802 to high performance I/O bus 806, whereas I/O bus bridge 812 couples the two buses 806 and 808 to each other. A system memory 814 and one or more network interfaces 816 couple to high performance I/O bus 806. The computer system 800 may further include video memory and a display device coupled to the video memory (not shown). Mass storage 818 and I/O ports 820 couple to the standard I/O bus 808. The computer system 800 may optionally include a keyboard and pointing device, a display device, or other input/output devices (not shown) coupled to the standard I/O bus 808. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 800, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 800 are described in greater detail below. In particular, the network interface 816 provides communication between the computer system 800 and any of a wide range of networks, such as an Ethernet (e.g., IEEE 802.3) network, a backplane, etc. The mass storage 818 provides permanent storage for the data and programming instructions to perform the above-described processes and features implemented by the respective computing systems identified above, whereas the system memory 814 (e.g., DRAM) provides temporary storage for the data and programming instructions when executed by the processor 802. The I/O ports 820 may be one or more serial and/or parallel communication ports that provide communication between additional peripheral devices, which may be coupled to the computer system 800.

The computer system 800 may include a variety of system architectures, and various components of the computer system 800 may be rearranged. For example, the cache 804 may be on-chip with processor 802. Alternatively, the cache 804 and the processor 802 may be packed together as a "processor module", with processor 802 being referred to as the "processor core". Furthermore, certain embodiments of the invention may neither require nor include all of the above components. For example, peripheral devices coupled to the standard I/O bus 808 may couple to the high performance I/O bus 806. In addition, in some embodiments, only a single bus may exist, with the components of the computer system 800 being coupled to the single bus. Moreover, the computer system 800 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 800 that, when read and executed by one or more processors, cause the computer system 800 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 800, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 802. Initially, the series of instructions may be stored on a storage device, such as the mass storage 818. However, the series of instructions can be stored on any suitable computer readable storage medium. Furthermore, the series of instructions need not be stored locally, and could be received from a remote storage device, such as a server on a network, via the network interface 816. The instructions are copied from the storage device, such as the mass storage 818, into the system memory 814 and then accessed and executed by the processor 802. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 800 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   determining, by a computing system, that a user operating a first wireless communication device has selected a web-based option for establishing a wireless Voice over Internet Protocol (VOIP) communication with a second computing device, the web-based option associated with a content item provided to the first wireless communication device by the computing system;
   determining, by the computing system, based on the selected web-based option, information to be provided to the second computing device;
   correlating, by the computing system, at least one phone number from a set of available phone numbers with the information to be provided to the second computing device, wherein the at least one phone number is not an actual phone number of the first wireless communication device, wherein the information to be provided is stored by the computing system, and wherein the at least one phone number references the information to be provided;
   establishing, by the computing system, the wireless VOIP communication between the first wireless communication device and the second computing device using the at least one phone number;
   providing, by the computing system, to the second computing device, the at least one phone number as caller ID phone number information associated with the first wireless communication device when establishing the wireless VOIP communication; and
   providing, by the computing system, to the second computing device, the information describing the content item associated with the web-based option and at least one or more attributes of a user operating the first wireless communication device, the information further describing the first wireless communication device and a network carrier through which the first wireless communication device is communicating, wherein the at least one or more attributes of the user include at least one of demographic information of the user and a rating indicating an importance of the user to an operator of the second computing device, wherein the demographic information includes information about whether the user is in a targeted gender and age group.

2. The computer-implemented method of claim 1, wherein the information further includes at least one of: information describing a network experience of the user, information provided by the network carrier, or information describing at least one targeting segment corresponding to the user.

3. The computer-implemented method of claim 1, wherein correlating, by the computing system, the at least one phone number with the information further comprises:
   selecting the at least one phone number from a set of phone numbers;
   correlating the information with the at least one phone number; and
   storing the correlation between the at least one phone number and the information, wherein the information is able to be obtained using the at least one phone number.

4. The computer-implemented method of claim 1, wherein the information includes a first value and a second value, and wherein correlating, by the computing system, the at least one phone number with the information further comprises:
   determining, based on the information, that the information includes the first value and the second value;
   determining, from a set of phone numbers, the at least one phone number that has been allocated to correspond to the first value and the second value; and
   selecting the at least one phone number to communicate the information, wherein the information is able to be determined based solely on the at least one phone number.

5. The computer-implemented method of claim 1, further comprising:
   providing, by the computing system, an application programming interface (API) for obtaining the information correlated with phone numbers, wherein the second computing device is able to obtain the information correlated with the at least one phone number by providing the at least one phone number to the API.

6. The computer-implemented method of claim 1, wherein determining, by the computing system, the information to be provided to the second computing device further comprises:
   determining one or more targeting segments associated with the content item; and
   determining one or more attributes of the user that correspond to respective targeting segments associated with the content item, wherein the one or more attributes of the user are included in the information provided to the second computing device.

7. The computer-implemented method of claim 1, wherein correlating, by the computing system, the at least one phone number with the information further comprises:
   determining a priority level of the communication;
   selecting the at least one phone number from a set of phone numbers based at least in part on the priority level, wherein one or more phone numbers in the set of phone numbers are allocated to represent a respective priority level; and
   correlating the information with the at least one phone number.

8. A system comprising:
   at least one processor; and
   a memory storing instructions that, when executed by the at least one processor, cause the system to perform:

determining that a user operating a first wireless communication device has selected a web-based option for establishing a wireless Voice over Internet Protocol (VOIP) communication with a second computing device, the option associated with a content item provided to the first wireless communication device by the computing system;

determining, based on the selected web-based option, information to be provided to the second computing device;

correlating at least one phone number from a set of available phone numbers with the information to be provided to the second computing device, wherein the at least one phone number is not an actual phone number of the first wireless communication device, wherein the information to be provided is stored by the system, and wherein the at least one phone number references the information to be provided;

establishing the wireless VOIP communication between the first wireless communication device and the second computing device using the at least one phone number;

providing, to the second computing device, the at least one phone number as caller ID phone number information associated with the first wireless communication device when establishing the wireless VOIP communication; and providing to the second computing device, the information describing the content item associated with the web-based option and at least one or more attributes of a user operating the first wireless communication device, the information further describing the first wireless communication device and a network carrier through which the first wireless communication device is communicating, wherein the at least one or more attributes of the user include at least one of demographic information of the user and a rating indicating an importance of the user to an operator of the second computing device, wherein the demographic information includes information about whether the user is in a targeted gender and age group.

9. The system of claim 8, wherein correlating the at least one phone number with the information further comprises:

selecting the at least one phone number from a set of phone numbers;

correlating the information with the at least one phone number; and storing the correlation between the at least one phone number and the information, wherein the information is able to be obtained using the at least one phone number.

10. The system of claim 8, wherein the information includes a first value and a second value, and wherein correlating the at least one phone number with the information further comprises:

determining, based on the information, that the information includes the first value and the second value;

determining, from a set of phone numbers, the at least one phone number that has been allocated to correspond to the first value and the second value; and selecting the at least one phone number to communicate the information, wherein the information is able to be determined based solely on the at least one phone number.

11. A non-transitory computer-readable storage medium including instructions that, when executed by at least one processor of a computing system, cause the computing system to perform:

determining that a user operating a first wireless communication device has selected a web-based option for establishing a wireless Voice over Internet Protocol (VOIP) communication with a second computing device, the option associated with a content item provided to the first wireless communication device by the computing system;

determining, based on the selected web-based option, information to be provided to the second computing device;

correlating at least one phone number from a set of available phone numbers with the information to be provided to the second computing device, wherein the at least one phone number is not an actual phone number of the first wireless communication device, wherein the information to be provided is stored by the computer system, and wherein the at least one phone number references the information to be provided;

establishing the wireless VOIP communication between the first wireless communication device and the second computing device using the at least one phone numbers;

providing, to the second computing device, the at least one phone number as caller ID phone number information associated with the first wireless communication device when establishing the wireless VOIP communication; and providing to the second computing device, the information describing the content item associated with the web-based option and at least one or more attributes of a user operating the first wireless communication device, the information further describing the first wireless communication device and a network carrier through which the first wireless communication device is communicating, wherein the at least one or more attributes of the user include at least one of demographic information of the user and a rating indicating an importance of the user to an operator of the second computing device, wherein the demographic information includes information about whether the user is in a targeted gender and age group.

12. The non-transitory computer-readable storage medium of claim 11, wherein correlating the at least one phone number with the information further comprises:

selecting the at least one phone number from a set of phone numbers;

correlating the information with the at least one phone number; and storing the correlation between the at least one phone number and the information, wherein the information is able to be obtained using the at least one phone number.

13. The non-transitory computer-readable storage medium of claim 11, wherein the information includes a first value and a second value, and wherein correlating the at least one phone number with the information further comprises:

determining, based on the information, that the information includes the first value and the second value;

determining, from a set of phone numbers, the at least one phone number that has been allocated to correspond to the first value and the second value; and selecting the at least one phone number to communicate the information, wherein the information is able to be determined based solely on the at least one phone number.

* * * * *